United States Patent [19]
Ohzeki

[11] Patent Number: 4,966,814
[45] Date of Patent: Oct. 30, 1990

[54] ELECTROLESS PLATING-SUSCEPTIVE, FIRE RETARDANT POLYPHENYLENE ETHER RESIN

[75] Inventor: Jurou Ohzeki, Kimitsu, Japan

[73] Assignee: Asahi Kasei Kogyo Kabushiki Kaisha, Osaka, Japan

[21] Appl. No.: 403,262

[22] Filed: Sep. 5, 1989

[30] Foreign Application Priority Data

Sep. 7, 1988 [JP] Japan .................................. 63-222518
Sep. 7, 1988 [JP] Japan .................................. 63-222519

[51] Int. Cl.$^5$ ...................... B32B 15/04; B32B 15/08; B32B 27/38
[52] U.S. Cl. .................................. 428/457; 428/463; 428/418; 525/68; 525/905
[58] Field of Search .................. 428/418, 457, 463; 525/68, 905

[56] References Cited

U.S. PATENT DOCUMENTS 3,383,435 5/1968 Cizek .................................. 260/874
3,663,654 5/1972 Hnaf .................................. 260/874
4,599,380 7/1986 Ueda et al. .......................... 525/68

FOREIGN PATENT DOCUMENTS 61-126168 6/1986 Japan .

*Primary Examiner*—Michael Lusignan
*Attorney, Agent, or Firm*—Armstrong, Nikaido, Marmelstein, Kubovcik & Murray

[57] ABSTRACT

A electroless plating-susceptive fire retardant polyphenylene ether resin comprising a polyphenylene ether resin; a rubber-modified resin comprising a grafted rubber phase comprising an elastomeric rubber having grafted thereto, in a specific grafting degree, a graft component composed of acrylonitrile units and vinyl aromatic compound units and a resin phase of a polymer or polymer mixture comprising acrylonitrile units and vinyl aromatic compound units; and optionally, a polystyrene resin in specific proportions; and also comprising red phosphorus and a phosphoric acid ester in specific amounts. The graft component and the resin phase have specific contents of acrylonitrile units and the amount of all the acrylonitrile units in rubber-modified resin and the amount of the elastomeric rubber are within specific ranges. The composition has not only excellent susceptibility to electroless plating but also excellent fire retardance, impact resistance and heat resistance. A shaped fire retardant resin article having thereon a plating formed by electroless plating can readily be obtained from the composition of the present invention.

10 Claims, No Drawings

ELECTROLESS PLATING-SUSCEPTIVE, FIRE RETARDANT POLYPHENYLENE ETHER RESIN

BACKGROUND OF THE INVENTION

1. Field Of The Invention

The present invention relates to an electroless plating-susceptive, fire retardant polyphenylene ether composition. More particularly, the present invention is concerned with an electroless plating-susceptive, fire retardant polyphenylene ether composition comprising a polyphenylene ether resin; a rubber-modified resin comprising a grafted rubber phase comprising an elastomeric rubber having grafted thereto, in a specific grafting degree, a graft component composed of acrylonitrile units and vinyl aromatic compound units, and a resin phase of a polymer or polymer mixture comprising acrylonitrile units and vinyl aromatic compound units; and, optionally, a polystyrene resin in specific proportions; and also comprising red phosphorus and a phosphoric acid ester in specific amounts. The graft component and the resin phase each have a specific content of acrylonitrile units, and the amount of all the acrylonitrile units in the rubber-modified resin and the amount of the elastomeric rubber are within specific ranges. The composition of the present invention has not only excellent fire retardance but also excellent susceptibility to electroless plating. For example, a plating can readily be formed on a shaped article of the composition by electroless plating, particularly by a simple method comprising the steps of degreasing and etching the shaped article, applying a catalyst on the article, and activating the catalyst, followed by electroless plating. Therefore, a shaped, fire retardant resin article having thereon a plating formed by electroless plating can readily be obtained from the composition of the present invention.

2. Discussion Of Related Art

In recent years, electronic equipment has been improved according to the marked advance of electronics. In this connection, it is noted that so-called electromagnetic wave interference, such as incorrect operation of an electronic equipment and noise generation from a receiver due to high-frequency electromagnetic waves generated from electronic parts of other electronic equipment, has become a great problem. In this situation, regulations in the U.S.A. and West Germany and self-regulation in Japan have been promulgated with respect to the shielding of the high frequency electromagnetic wave interference, etc. The regulations have been becoming more and more severe.

On the other hand, use of resins for housings of electronic equipment has been increasing with the advance in electronics. Since a conventional resin made housing for electronic equipment is not electrically conductive, it does not have a shielding effect against electromagnetic waves. Due to the increased use of resin-made housings for electronic equipment, occurrence of electromagnetic wave interference has been increased. On the other hand, most electronic equipment has electrically active parts, the housings for such electronic equipment are required to have fire retardance. Further, the housings for electronic equipment are required to have impact resistance and heat resistance.

As a material having fire retardance, a composition comprising a polyphenylene ether resin (hereinafter often referred to as "PPE resin") and a polystyrene resin (hereinafter often referred to as "PS resin") is known. Since a composition comprising PPE resin and PS resin has not only excellent mechanical properties, thermal properties and electrical properties but also low specific gravity and low moisture absorption properties, it is frequently used as a material for housings of electronic equipment. However, the composition per se is not electrically conductive and, therefore, the composition does not have a shielding effect against electromagnetic waves.

In order to impart an electromagnetic wave-shielding property to a housing made of a resin, it has been proposed to incorporate an electrically conductive filler into a resin, or to subject a housing made of a resin to a surface treatment for imparting electrical conductivity to the housing, for example, treatment by the coating, vacuum deposition or sputtering of an electrically conductive material; metal spraying, or plating by, for example, electroless plating. Of these proposals, electroless plating is the most advantageous from the viewpoints of effectiveness and reliability in shielding effect. However, it is noted that only a terpolymer of acrylonitrile (hereinafter often referred to as "AN"), butadiene and styrene (hereinafter often referred to as "ABS resin") is known as a resin having good susceptibility to electroless plating. Resins other than ABS resin have poor susceptibility to electroless plating. Therefore, with respect to resins other than ABS resin, for imparting good susceptibility to electroless plating, it is necessary to incorporate an inorganic filler into the resin, to subject a shaped resin article to surface treatment, such as pre-etching treatment, post-etching treatment and neutralization, in the process of plating, or to anneal a shaped resin article to improve adhesion for plating. These techniques disadvantageously lead to a lowering of the properties of the resin per se, an increase in cost or the like. Further, for providing an ABS resin having improved fire retardance, it has been proposed to incorporate a halide (as fire retardant) into an ABS resin to obtain a fire retardant ABS resin (hereinafter often referred to as "FRABS resin"). However, an FRABS resin has drawbacks in that it has a low heat distortion temperature and in that not only corrosion of a metal mold but also deterioration of a catalyst used for plating is caused due to the halide incorporated.

In these situations, various attempts have been made with respect to a composition comprising a PPE resin and an ABS resin in order to develop a new resin composition having not only excellent susceptibility to electroless plating but also excellent fire retardance.

U.S. Pat. No. 3,383,435 discloses a composition comprising an ABS resin and poly(2,6-dimethyl-1,4-phenylene)ether. In the example described in U.S. Pat. No. 3,383,435, compositions are prepared from a polyphenylene ether resin and an ABS resin comprising 16% of acrylonitrile units, 41% of styrene units, and 43% of butadiene units. However, as is apparent from the comparative data described in the example in U.S. Pat. No. 3,383,435, as between the properties of these compositions and those of a composition comprising a polyphenylene ether and a polystyrene or a composition comprising a polyphenylene ether and a high impact polystyrene, the compositions comprising an ABS resin and a polyphenylene ether are too brittle to be of practical use. This is attributable to a poor compatibility between an ABS resin and a polyphenylene ether.

In general, when a resin containing a large amount of a rubber component having double bonds, which is represented by, for example, an ABS resin, is intended to be rendered fire retardant by incorporating therein a phosphorus compound, such as a phosphoric acid ester, the phosphorus compound needs to be added in a large amount, leading to a lowering of the heat resistance of the resultant fire retardant composition.

U.S. Pat. No. 3,663,654 discloses a resin composition comprising a PPE resin and an ABS resin (as one example of a PS resin), which has been rendered fire retardant by incorporating therein red phosphorus. However, as apparent from Example 5 of U.S. Pat. No. 3,663,654, the ABS resin used, i.e., Blendex 401 (produced and sold by Marbon Chemical Co., U.S.A.) is a conventional ABS resin and, hence, the composition should be such that the compatibility between the PPE resin and the ABS resin is not improved. Further, when the fire retardance of the composition of this U.S. patent is examined with respect to a sample having a 3.2 mm thickness, the composition has flammability and glowing characteristics as high as that represented by Class V-1 in accordance with a UL-94 standard which will be explained later. Therefore, the composition cannot be used as a material for housings for electronic equipment.

U.S. Pat. No. 4,599,380 discloses a composition comprising a PPE resin and a specific ABS resin. However, it is noted that this composition was developed to improve solvent resistance and colorability of a resin composition, and no teaching or suggestion is made with respect to a composition having not only excellent susceptibility to electroless plating and good adhesion of a plating formed on a shaped article made of the composition, but also excellent fire retardance, impact resistance and heat resistance.

Japanese Patent Application Laid-Open Specification No. 61-126168 discloses a shaped resin article having thereon a plating formed by electroless plating. The resin article is made of a fire retardant composition comprising a PPE resin, an ABS resin, a fire retardant, such as an aromatic phosphoric acid ester, red phosphorus, an organic halide or antimony trioxide. However, in this reference, there is neither a description nor an example providing data with respect to the influence of the use of the fire retardant on the susceptibility to electroless plating and on the fire retardance of the shaped article. No teaching or suggestion is made with respect to a composition having not only excellent susceptibility to electroless plating and good adhesion of a plating formed on a shaped article made of the composition, but also excellent fire retardance, impact resistance and heat resistance.

As described above, conventional compositions comprising a PPE resin and an ABS resin do not simultaneously exhibit all of the desired properties for resin materials to be used for electric or electronic equipment, i.e., excellent susceptibility to electroless plating, fire retardance, freedom from foliation, sufficient impact resistance, heat resistance and capability of providing a shaped article having thereon a plating simply formed by electroless plating.

SUMMARY OF THE INVENTION

The present inventor has made extensive and intensive studies with a view toward developing a fire retardant PPE resin-ABS resin composition having excellent susceptibility to electroless plating while maintaining excellent fire retardance, impact resistance and heat resistance. As a result, the present inventor has obtained the following findings.

(1) When an aromatic phosphoric acid ester as a fire retardant is employed in a large amount for attaining a satisfactory fire retardance, the heat distortion temperature of the resin composition is disadvantageously lowered and, therefore, it is necessary to increase the amount of a PPE resin to maintain a desired heat resistance. However, the use of large amounts of both an aromatic phosphoric acid ester and a PPE resin disadvantageously leads to a lowering of not only the susceptibility of a shaped article of the resin composition to electroless plating but also the adhesion of a plating to the shaped article.

(2) The use of red phosphorus as a fire retardant has no adverse influence on the heat resistance (particularly, the heat distortion temperature) of the resin composition. Therefore, when red phosphorus is used as an additional fire retardant, not only can the necessary amount of an aromatic phosphoric acid ester be reduced but also the necessary amount of PPE resin can be reduced, so that not only the desired fire retardance but also the desired susceptibility to electroless plating can be attained without sacrificing the heat resistance of the resin. However, the use of too large an amount of red phosphorus has an adverse effect on the impact strength of the resin composition and, therefore, the combined use of red phosphorus with an aromatic phosphoric acid ester is advantageous for attaining the desired fire retardance without sacrificing the impact strength of the resin composition.

(3) When compatibility of an ABS resin with a PPE resin is improved, electroless plating can advantageously be performed to give a plating having a uniform thickness and excellent adhesion to a shaped resin article.

(4) When the amount of an ABS resin is too large, the surface appearance of an ultimate shaped resin article having a plating formed by electroless plating is poor.

(5) The amount of acrylonitrile in the PPE resin-ABS resin composition has a great influence not only on the foliation properties of a shaped article of the composition but also on the susceptibility of the shaped article to electroless plating and adhesion of a plating to the shaped article.

Based on these novel findings, the present inventors have made further investigations, and have succeeded in developing an electroless plating-susceptive, fire retardant resin composition comprising a polyphenylene ether resin and a specific rubber-modified resin containing an extremely specific amount of acrylonitrile units, which exhibits not only excellent fire retardance but also excellent susceptibility to electroless plating. Thus, the present invention has been completed.

It is, therefore, an object of the present invention to provide an electroless plating-susceptive, fire retardant polyphenylene ether composition having not only excellent fire retardance, impact resistance and heat resistance but also excellent susceptibility to electroless plating.

The foregoing and other objects, features and advantages of the present invention will be apparent from the following detailed description and appended claims.

DETAILED DESCRIPTION OF THE INVENTION

According to the present invention there is provided an electroless plating-susceptive, fire retardant polyphenylene ether resin composition comprising:

(A) 10 to 60% by weight, based on the total weight of components (A), (B) and (C), of a polyphenylene ether resin;

(B) 10 to 90% by weight, based on the total weight of components (A), (B) and (C), of a rubber-modified resin comprising (α) a grafted rubber phase comprising an elastomeric rubber having grafted thereto a graft component composed of acrylonitrile units and vinyl aromatic compound units and (62) a resin phase of a polymer or polymer mixture comprising acrylonitrile units and vinyl aromatic compound units, the grafted rubber phase (α) having a grafting degree of from 40 to 300% as defined by the ratio (%) of the weight of the graft component grafted to the elastomeric rubber to the weight of said elastomeric rubber, the content of the acrylonitrile units in said graft component and the content of the acrylonitrile units in resin phase (β) being from 10 to 30% by weight, based on the weight of the graft component and from 3 to 9% by weight, based on the weight of resin phase (β), respectively, the amount of all the acrylonitrile units in rubber-modified resin (B) being from 1 to 7% by weight, based on the total weight of components (A), (B) and (C), the amount of the elastomeric rubber being from 5 to 20% by weight, based on the total weight of components (A), (B) and (C);

(C) 0 to 80% by weight, based on the total weight of components (A), (B) and (C), of a polystyrene resin;

(D) 1 to 4 parts by weight of red phosphorus per 100 parts by weight of the total of components (A), (B) and (C); and (E) 1 to 12 parts by weight of a phosphoric acid ester per 100 parts by weight of the total of components (A), (B) and (C).

The polyphenylene ether which is used as component (A) of the composition of the present invention, is selected from a homopolymer comprising a recurring unit represented by the general formula:

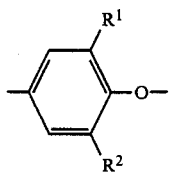

(I)

(wherein each of $R^1$ and $R^2$ independently represents a straight chain, or branched primary or secondary alkyl, hydroxyalkyl or haloalkyl group having 1 to 4 carbon atoms, an aryl group, a halogen atom or a hydrogen atom, provided that $R^1$ and $R^2$ are not concurrently a hydrogen atom);

a copolymer comprising a recurring unit represented by the above-mentioned formula (I) and a recurring unit represented by the general formula:

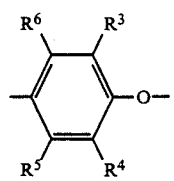

(II)

(wherein each of $R^3$, $R^4$, $R^5$ and $R^6$ independently represents a straight chain, or branched primary or secondary alkyl, hydroxyalkyl or haloalkyl group having 1 to 4 carbon atoms, an aryl group, a halogen atom or a hydrogen atom, provided that $R^3$ and $R^4$ are not concurrently a hydrogen atom);

a grafted copolymer comprising the above-mentioned homopolymer or copolymer and, grafted thereon, styrene; and the like. These polyphenylene ethers are disclosed in U.S. Pat. Nos. 3,825,521; 4,558,119 and 4,788,277. These polymers, copolymers and grafted copolymers may be chemically treated to stabilize the terminals thereof by acetylation, esterification, benzoylation, etc.

Representative examples of polyphenylene ether homopolymers include poly(2,6-dimethyl-1,4-phenylene)ether; poly(2-methyl-6-ethyl-1,4-phenylene)ether; poly(2,6-diethyl-1,4-phenylene)-ether; poly(2-ethyl-6-n-propyl-1,4-phenylene)ether; poly(2,6-di-n-propyl-1,4-phenylene)ether; poly(2-methyl-6-n-butyl-1,4-phenylene)ether; poly(2-ethyl6-isopropyl-1,4-phenylene)ether; poly(2-methyl-6-chloro-1,4-phenylene)ether; poly(2-methyl-6-hydroxyethyl-1,4-phenylene)ether; poly(2-methyl-6-chloroethyl-1,4-phenylene)ether; and the like. These can be used individually or in combination.

Representative examples of polyphenylene ether copolymers include a polyphenylene ether copolymer which is obtained by copolymerizing 2,6-dimethyl-phenol with o-cresol or an alkyl-substituted phenol, e.g., 2,3,6-trimethylphenol, represented by the formula:

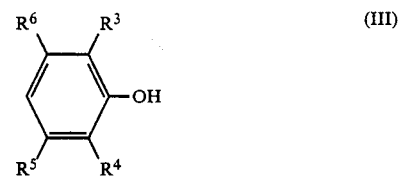

(III)

(wherein $R^3$, $R^4$, $R^5$ and $R^6$ have the same meanings as described above).

These can be used indivudually or in combination.

In the case of either the homopolymer or copolymer, a polyphenylene ether having a polymerization degree of 0.30 to 1.5, preferably 0.4 to 1.0 in terms of the intrinsic viscosity $\partial \eta[$ (chloroform solution, 30° C.) is used.

Rubber-modified resin (B) used in the composition of the present invention comprises (α) a grafted rubber phase and (β) a resin phase. Grafted rubber phase (α) comprises an elastomeric rubber having grafted thereto a graft component composed of acrylonitrile units and vinyl aromatic compound units. Resin phase (β) comprises a polymer or polymer mixture comprising acrylonitrile units and vinyl aromatic compound units.

As the elastomeric rubber used in grafted rubber phase (α) of rubber-modified resin (B), there may preferably be employed elastomeric rubbers having a double bond, such as conjugated diene-type rubbers. Representative examples of such elastomeric rubbers include polybutadiene, a styrenebutadiene copolymer, a butadiene-AN copolymer, a styrene-butadiene block copolymer, polyisoprene and natural rubber. Of these elastomeric rubbers, polybutadiene and a styrene-butadiene copolymer are more preferred. Use of an elastomeric rubber having no conjugated double bond, such as an ethylenepropylene copolymer and a completely hydrogenated product of a styrene-butadiene block copolymer, is not recommendable since the final resin composition is likely to have not only poor susceptibility to etching but also poor anchoring effect, thereby causing the adhesion of a plating to be poor.

The vinyl aromatic compound units in grafted rubber phase (α) and resin phase (β) of rubber-modified resin (B) are selected from monomer units of compounds represented by the formula:

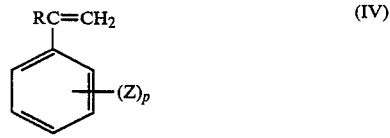

wherein R represents a hydrogen atom, a halogen atom or an alkyl group having 1 to 3 carbon atoms; Z represents a hydrogen atom, a halogen atom, a vinyl group or an alkyl group having 1 to 4 carbon atoms; and p is an integer of 1 to 5.

These compounds can be used individually or in combination. Representative examples of vinyl aromatic compounds include styrene, α-methylstyrene, vinyltoluene, vinylethylbenzene, vinylxylene, tert-butystyrene and chlorostyrene.

The vinyl aromatic compound units in grafted rubber phase (α) are not necessarily the same as those in resin phase (β). In other words, the vinyl aromatic compound units in grafted rubber phase (α) and those in resin phase (β) can be selected independently from the above-mentioned monomer units of vinyl aromatic compounds.

In the present invention, grafted rubber phase (α) of component (B) is required to have a grafting degree of from 40 to 300%, preferably from 40 to 200%, as defined by the ratio (%) of the total weight of the graft component grafted to the elastomeric rubber to the weight of the elastomeric rubber. When the grafting degree is less than 40%, not only is the compatibility of component (B) with components (A) and (C) poor, thereby disadvantageously leading to foliation of an ultimate shaped resin article, but also the dispersion of component (B) in the final resin composition is poor so that the shaped resin article becomes less susceptive to electroless plating, leading to not only non-uniformity in thickness of a plating but also poor adhesion of the plating to the shaped article. With respect to a grafting degree exceeding 300%, an extremely long polymerization time is required for obtaining such a high grafting degree. This is disadvantageous from the economical point of view.

The content of acrylonitrile units in the graft component and the content of the acrylonitrile units in resin phase, (β) are from 20 to 30% by weight, based on the weight of the graft component and from 3 to 9 % by weight, based on the weight of resin phase (β), respectively. When the content is acrylonitrile units in the graft component and in resin phase (β) is lower than 10% by weight and lower than 3% by weight, respectively, not only deposition of a plating on a shaped article of the final resin composition but also adhesion of the plating to the shaped article is poor. On the other hand, when the content is higher than 30% by weight and higher than 9% by weight, respectively, not only is a shaped article of the final resin composition likely to suffer from foliation but also the shaped article is less susceptive to etching in the procedure for electroless plating.

The rubber-modified resin useful as component (B) of the composition of the present invention can easily be obtained from an elastomeric rubber, a vinyl aromatic compound and acrylonitrile, as is described later. Representative examples of rubber-modified resins include an ABS resin comprising two phases, i.e., a grafted rubber phase (α) composed of acrylonitrile units, styrene units and butadiene units, and a resin phase (β) composed of arylonitrile units and styrene units; and a mixture of another type of ABS resin ∂as grafted rubber phase (α)[ in which acrylonitrile units and vinyl aromatic compound units are grafted to the butadiene moiety, and an AN-styrene resin ∂as resin phase (β)[.

The polystyrene resin useful as component (C) of the composition of the present invention can be any of those which are known to be able to be used together with a PPE resin, and is suitably a resin comprising at least 25% by weight of the units represented by formula (IV) described above. Representative examples of polystyrene resins include a homopolymer, such as polystyrene; a copolymer, such as styrene-maleic anhydride copolymer; and a modified polystyrene, such as a rubber-modified polystyrene. Particularly preferable examples of polystyrene resins include a high impact polystyrene (hereinafter often referred to as "HIPS"), such as a polystyrene modified with natural rubber or synthetic rubber. As examples of the synthetic rubber to be used for the modification, there can be mentioned polybutadiene, polyisoprene, a styrene-butadiene copolymer and the like. Of the above polystyrene resins, a polystyrene modified with polybutadiene is most preferred.

In the composition of the present invention, the amount of the polyphenylene ether resin as component (A), is from 10 to 60% by weight, preferably from 20 to 40% by weight, based on the total weight of components (A) is lower than 10% by weight, the excellent effect of the PPE resin is not fully exerted. On the other hand, when the amount exceeds 60% by weight, the final shaped resin article is too susceptive to etching by an etching solution containing chromic acid which is usually employed in the pre-treatment for electroless plating, so that the surface of the shaped article becomes excessively roughened, thereby leading to poor adhesion of plating to the shaped article and poor appearance of the plates shaped article.

The suitable amount of the rubber-modified resin as component (B) varies depending upon the amount of all the acrylonitrile units in rubber-modified resin (B) and the amount of the elastomeric rubber. In the present invention, the amount of rubber-modified resin (B) is from 10 to 90% by weight, preferably from 15 to 70% by weight, based on the total weight of components (A), (B) and (C). When the amount of rubber-modified resin (B) is lower than 10% by weight, a satisfactory susceptibility to electroless plating cannot be attained. On the other hand, when the amount exceeds 90% by weight, the amount of a PPE resin in the composition disadvantageously becomes less than the amount required for attaining the objects of the present invention, i.e., 10% by weight, based on the total weight of components (A), (B) and (C).

The amount of the polystyrene resin as component (C) is from 0 to 80% by weight, preferably 0 to 65% by weight, based on the total weight of components (A), (B) and (C). In the present invention, the component (C) is optionally employed in an amount up to 80% by weight in order to improve the compatibility between components (A) and (B), heat distortion temperature and impact resistance of the final resin composition. When the rubber modified resin as component (B) has satisfactory compatibility, heat distortion temperature and impact resistance, component (C) is not needed. When the amount of component (C) exceeds 80% by weight, components (A) and/or (B) cannot be used in the amounts required for attaining the objects of the present invention.

The amount of all the acrylonitrile units (AN units) in rubber-modified resin (B) is from 1 to 7% by weight, preferably 1 to 5% by weight, based on the total weight of components (A), (B) and (C). When the amount of AN units is lower than 1% by weight, it becomes difficult to attain the deposition of a catalyst, e.g., palladium, which is a seed for an electroless plating to a shaped article, in the procedure for electroless plating. When the amount of AN units exceeds 7% by weight, not only does an elastomeric rubber become disadvantageously resistant to the action of a treating agent for etching so that it becomes difficult to perform etching of a shaped article of the resin composition under etching conditions such that PPE resin is not eroded, leading to a poor adhesion of a plating to a shaped article, but also there cannot be obtained a shaped article substantially free from foliation.

The amount of elastomeric rubber is from 5 to 20% by weight, preferably 5 to 15% by weight, based on the total weight of components (A), (B) and (C). When the amount of elastomeric rubber is lower than 5% by weight, the anchoring effect for deposition is not satisfactory and, hence, strong adhesion of a plating cannot be attained. On the other hand, when the amount exceeds 20% by weight, not only cannot satisfactory fire retardance be attained, but also susceptibility to etching becomes too high, resulting in too rough a surface of a plate shaped article.

With respect to the red phosphorus useful as component (D) of the composition of the present invention, there is no particular limitation. However, red phosphorus coated with a thermosetting resin or an inorganic material is preferred from the viewpoint of safety. Representative examples of thermosetting resins include phenol resin, epoxy resin and a divinyl benzene-styrene copolymer. Representative examples of inorganic materials include titanium oxide and silicate compounds.

With respect to the phosphoric acid ester useful as component (E) of the composition of the present invention, there is no particular limitation. However, most preferred are aromatic phosphoric acid esters. Representative examples of aromatic phosphoric acid esters include triphenyl phosphate, tricresyl phosphate, trixylenyl phosphate, cresyl diphenyl phosphate, xylenyl diphenyl phosphate, dixylenyl phenyl phosphate, hydroquinone biphosphate, resorcinol bisphosphate and bisphenol A bisphosphate. These can be used individually or in combination.

The red phosphorus (D) is used in an amount of from 1 to 4 parts by weight, preferably 1.5 to 3.5 parts by weight, per 100 parts by weight of components (A), (B) and (C). When the amount of red phosphorus is less than 1 part by weight, satisfactory fire retardance cannot be attained. On the other hand, when the amount exceeds 4 parts by weight, the impact resistance of the final resin composition becomes extremely poor.

The phosphoric acid ester (E) is used in an amount of from 1 to 12 parts by weight, preferably 3 to 10 parts by weight, per 100 parts by weight of components (A), (B) and (C). When the amount is less than 1 part by weight, satisfactory fire retardance cannot be attained. On the other hand, when the amount exceeds 12 parts by weight, not only does the heat distortion temperature of the final composition become extremely low, but also the adhesion of a plating to a shaped article of the composition is extremely poor. In this connection, when the heat distortion temperature of the final composition is low due to the addition of the phosphoric acid ester in a large amount, an increased amount of a PPE resin is needed in order to attain a satisfactory heat distortion temperature of the final composition. However, as mentioned before, use of large amounts of the phosphoric acid ester and the PPE resin not only causes the final composition to be less susceptive to electroless plating but also causes adhesion of a plating to be poor.

In the present invention, as mentioned above, if the amount of both PPE resin and phosphoric acid ester are increased simultaneously, adhesion of a plating to a shaped article of the final composition is likely to be lowered. Hence, when the proportion of PPE resin is increased to attain the desired high heat distortion temperature, it is desirable that the amount of phosphoric acid ester be decreased.

The method for the production of a rubber-modified resin useful as component (B) is not particularly restricted as long as the resultant rubber-modified resin meets the above-mentioned requirements with respect to the grafting degree and the acrylonitrile content of the grafted rubber phase and of the resin phase. For example, the rubber-modified resin can be prepared by a generally known polymerization technique, such as emulsion polymerization, bulk polymerization, solution polymerization and suspension polymerization. For example, the rubber-modified resin can be prepared by producing a grafted rubber phase and a resin phase individually by polymerization, and then mixing the two phases with each other. The resin phase may be a copolymer of acrylonitrile and a vinyl aromatic compound, a mixture of a homopolymer of acrylonitrile and a homopolymer of a vinyl aromatic compound or a mixture of a homopolymer of acrylonitrile or a vinyl aromatic compound and a copolymer of acrylonitrile and a vinyl aromatic compound. Alternatively, the grafted rubber phase ($\alpha$) and the resin phase ($\beta$) of the rubber-modified resin can be simultaneously produced by, for example, the following two-step process. That is, a monomer mixture of 16 to 40% by weight of acrylonitrile and 60 to 84% by weight of a vinyl aromatic compound is subjected to graft polymerization in the presence of an elastomeric rubber to form (a) a copolymer composed of acrylonitrile units and a copolymer composed of acrylonitrile units and vinyl aromatic compound units, and subsequently a monomer mixture of 0 to 15% by weight of acrylonitrile and 85 to 100% by weight of a vinyl aromatic compound is added thereto and subjected to graft polymerization to form (b) a polymer composed of vinyl aromatic compound units or composed of acrylonitrile units and vinyl aromatic compound units. During the formation of copolymer (a) and component (b), the resin phase is formed simultaneously with the formation of the grafted rubber phase. The weight ratio of component (a) to component (b) is 9/1 to 1/9. By the above process, the grafted rubber phase ($\alpha$) and resin phase ($\beta$) can be formed simultaneously.

There are various methods of analysis of the rubber-modified resins. Those methods are described, for example, in J. Polymer Sci., A3, 3825 (1965), and Rubber Chem. & Technology, 38, No.3, 655 (1965). In the present invention, the separation of the grafted rubber phase and the resin phase, and the determination of the grafting degree of the grafted rubber phase were performed as follows. One gram of the rubber-modified resin is added to 25 ml of methyl ethyl ketone. The resultant mixture is shaken well, and then centrifuged at 20,000 rpm at 0° C., to separate the mixture into a precipitate and a supernatant solution. The supernatant solution contains the resin phase. The resin phase is recovered from the supernatant solution by precipitation with methanol. The precipitate obtained by centrifugation is recovered as the grafted rubber phase. As mentioned above, the terminology "grafting degree" is defined as the ratio (%) of the weight of the graft component grafted to the elastomeric rubber to the weight of the elastomeric rubber, and can be calculated by the following formula:

$$G = \frac{A - R}{R} \times 100$$

wherein G represents the grafting degree (% by weight); R the amount of elastomeric rubber contained in one gram of the rubber-modified resin (gram); and A the amount of the grafted rubber phase contained in one gram of the rubber-modified resin (gram).

The content of the acrylonitrile in each of the resin phase and grafted rubber phase is determined by the elementary analysis method, based on the amount of nitrogen.

In the polyphenylene ether resin composition of the present invention, there may be incorporated other additives known to those skilled in the art, such as plasticizers; stabilizers; ultraviolet absorbers; colorants; mold release agents; fibrous reinforcing agents, such as glass fibers and carbon fibers; and fillers, such as glass beads, calcium carbonate and talc. Preferred examples of plasticizers include polybutenes, low molecular weight polyethylenes, mineral oils, epoxidized soybean oils, polyethylene glycols, and fatty esters. Representative examples of stabilizers include phosphites, hindered phenols, alkanol amines, acid amides, metal salts of dithiocarbamic acid, inorganic sulfides and metal oxides. These are used individually or in combination.

The method of blending components (A) to (E) to form the polyphenylene ether resin composition of the present invention is not particularly restricted. That is, components (A) to (E) may be blended by generally known methods, for example, by means of an extruder, a heated roll, a Banbury mixer, a kneader and the like.

The polyphenylene ether resin composition of the present invention is excellent in susceptibility to electroless plating while exhibiting excellent fire retardant properties and excellent impact resistance and heat resistance.

Accordingly, a plated shaped article can readily be obtained by subjecting to electroless plating a shaped article of the retardant polyphenylene ether resin composition of the present invention, prepared by, for example, injection molding, press molding, blow molding or the like.

The plated shaped article produced by electroless plating of a shaped article prepared from the composition of the present invention has extremely excellent adhesion of the plating to the shaped article and electromagnetic wave shielding properties as compared to shaped articles prepared from a conventional resin composition containing a conductive filler or to a metallized article prepared by subjecting a conventional fire retardant composition to electroless plating, conductive coating, metal spraying, high-vacuum metallizing, sputtering or the like.

Since a plated shaped article made of the composition of the present invention can readily be obtained by subjecting a shaped article made of the composition of the present invention to a customary simple electroless plating method comprising the steps of degreasing, etching, applying a catalyst, activating the catalyst and effecting electroless plating, a plated shaped article made of the composition of the present invention can be produced at extremely low cost. Further, the heat distortion temperature of the composition of the present invention can be varied by changing the amount of the PPE resin. Accordingly, as contrasted to FRABS resins which have a low heat distortion temperature, the composition of the present invention has a wide variety of uses without being subjected to restriction in use due to a limited heat distortion temperature.

Further, the composition of the present invention is free from problems inherent in conventional resin compositions, e.g., deterioration of an employed catalyst by a halide as a fire retardant and occurrence of stress-cracking due to the residual strain when a shaped article is dipped in a treating agent for etching.

A plated shaped article made of the composition of the present invention obtained by electroless plating exhibits excellent adhesion of the plating to the shaped article such that no portion of the plating is peeled off even after the plated shaped article has been subjected to heat cycle testing (temperature: between −40° C. and a temperature which is 10° C. lower than the heat distortion temperature of the shaped article).

Moreover, when the composition of the present invention is molded into a shaped article having a complicated configuration, such as a boss or a part having a portion to be engaged with another part, even the inner wall of the boss or the engaging portion of the part can be completely metallized by electroless plating, and therefore, there is no failure in shielding properties from electromagnetic waves. Therefore, problems with respect to electromagnetic wave interference, which have become great problems, are solved by the use of the plated shaped article made of the composition of the present invention.

Still further, since the shaped article made of the composition of the present invention has excellent impact resistance and fire retardance, the shaped article substantially does not undergo breakage by the action of external forces, so that the electromagnetic wave-shielding properties can be maintained for a prolonged period of time.

The present invention will now be described in detail with reference to the following Examples and Comparative Examples which should not be construed as limiting the scope of the present invention.

Production of a rubber-modified resin

In each of Examples and Comparative Examples, a rubber-modified resin which was produced by one of the following representative methods was used.

Method 1:

A grafted rubber phase and a resin phase were individually prepared, and were mixed to obtain a grafted rubber phase, as follows.

(1) Preparation of a grafted rubber phase

60 Parts by weight (on a solids basis) of a polybutadiene latex having a weight average particle diameter of 4500 Å and 120 parts by weight of water were charged in a reactor and heated to 70° C. in an atmosphere of gaseous nitrogen while stirring. Then, to the resultant mixture, a monomer mixture of 10 parts by weight of acrylonitrile, 30 parts by weight of styrene and 0.1 part by weight of dodecyl mercaptan, and a solution prepared by dissolving 0.1 part by weight of potassium persulfate in 50 parts by weight of water were individually, simultaneously added over 5 hours. After completion of the addition, the reactor was kept at 70° C. for 2 hours to complete polymerization. The conversion of monomers was 95%.

(2) Preparation of a resin phase

120 Parts by weight of water and 1.0 part by weight of potassium rosinate for disproportionation were charged in a reactor and heated to 70° C. in an atmosphere of gaseous nitrogen while stirring. Then, to the resultant mixture, a monomer mixture of 4.5 parts by weight of acrylonitrile, 95.5 parts by weight of styrene and 0.2 part by weight of dodecyl mercaptan and a solution prepared by dissolving 0.2 part by weight of potassium persulfate in 50 parts by weight of water were individually, simultaneously added over 5 hours. After completion of the addition, the reactor was kept at 70° C. for 2 hours to complete polymerization. The conversion of monomers was 96%.

(3) Preparation of a rubber-modified resin

52 Parts by weight (on a solids basis) of the above-prepared grafted rubber phase and 48 parts by weight (on a solids basis) of the above-prepared resin phase were sufficiently mixed and dispersed in each other. The resultant dispersion was subjected to salting-out by adding 2.0 parts by weight of aluminum sulfate, followed by filtration. The resultant cake was washed with water and dried to obtain a rubber-modified resin No. 1.

The obtained rubber-modified resin was fractionated and analyzed according to the methods mentioned hereinbefore. The results are as follows.

| | |
|---|---|
| Polybutadiene content | 32% by weight |
| Grafting degree | 52% by weight |
| Acrylonitrile content of graft component | 24% by weight |
| Acrylonitrile content of resin phase | 7% by weight |

(4) Adjusting of the grafting degree and the AN content

In preparation of a grafted rubber phase, the grafting degree is usually adjusted by changing the amount of dodecyl mercaptan to be added. The larger the amount of dodecyl mercaptan, the lower the grafting degree becomes. The grafting degree can also be adjusted by changing the ratio of the amount of rubber to monomers in the polymerization or the period of time in which the monomer mixture and an aqueous potassium persulfate solution are added to the reactor. The acrylonitrile content of the graft component is adjusted by changing the amount of the acrylonitrile to be added in preparation of the grafted rubber phase. On the other hand, the acrylonitrile content of the resin phase is adjusted by changing the amount of the acrylonitrile to be added in preparation of the resin phase. Rubber-modified resins Nos. 2 to 8 shown in Table 1 were produced in the same manner as mentioned above except that the composition of the raw materials was changed as shown in Table 1.

Method 2:

50 Parts by weight (on a solids basis) of a polybutadiene latex having a weight average particle diameter of 4500 Å and 100 parts by weight of water were charged in a reactor and heated to 70° C. in an atmosphere of gaseous nitrogen while stirring. Then, to the resultant mixture, a primary monomer mixture of 10 parts by weight of acrylonitrile, 40 parts by weight of styrene and 0.1 part by weight of dodecyl mercaptan, and a solution prepared by dissolving 0.1 part by weight of potassium persulfate in 50 parts by weight of water were individually, simultaneously added over 3 hours to conduct a primary polymerization reaction. After completion of the addition, to the reaction mixture, a secondary monomer mixture of 60 parts by weight of styrene and 0.1 part by weight of dodecyl mercaptan, and a solution prepared by dissolving 0.1 part by weight of potassium persulfate in 50 parts by weight of water were individually, simultaneously added over 3 hours to conduct a secondary polymerization reaction. After completion of the addition, the reactor was kept at 70° C. for 2 hours to complete the polymerization reaction. The conversion of monomers was 93%. The resultant polymer was subjected to salting-out by adding 3 parts by weight of aluminum sulfate, followed by filtration. The resultant cake was washed with water and dried to obtain a rubber-modified resin No. 9. The obtained rubber-modified resin was fractionated and analyzed according to the methods mentioned hereinbefore. The results are as follows.

| | |
|---|---|
| Polybutadiene content | 32% by weight |
| Grafting degree | 80% by weight |
| Acrylonitrile content of graft component | 16% by weight |
| Acrylonitrile content of resin phase | 5% by weight |

Rubber-modified resin No. 10 shown in Table 1 was produced in the same manner as mentioned above except that the composition of the raw materials was changed as shown in Table 1.

TABLE 1

| | rubber-modified resin No. | | | | | | | | | |
|---|---|---|---|---|---|---|---|---|---|---|
| | 1 | 2 | 3 | 4 | 5 | 6 | 7 | 8 | 9 | 10 |
| | preparation method | | | | | | | | | |
| | method 1 | method 1 | method 1 | method 1 | method 1 | method 1 | method 1 | method 1 | method 2 | method 2 |
| polybutadiene content (wt. %) | 32 | 28 | 32 | 32 | 30 | 28 | 30 | 28 | 32 | 20 |
| grafting degree (wt. %) | 52 | 150 | 32 | 52 | 60 | 62 | 120 | 60 | 80 | 200 |
| AN content of graft component (wt. %) | 24 | 15 | 20 | 24 | 34 | 12 | 27 | 7.5 | 16 | 26 |
| AN content of resin phase (wt. %) | 7 | 7 | 6 | 13 | 5 | 4 | 8 | 1.5 | 5 | 8 |
| polymeri- formulation of polybutadiene grafted rubber (part) | 60 | 35 | 70 | 60 | 60 | 50 | 40 | 55 | 50 | 30 |

TABLE 1-continued

| | | | rubber-modified resin No. | | | | | | | | | |
|---|---|---|---|---|---|---|---|---|---|---|---|---|
| | | | 1 | 2 | 3 | 4 | 5 | 6 | 7 | 8 | 9 | 10 |
| | | | preparation method | | | | | | | | | |
| | | | method 1 | method 1 | method 1 | method 1 | method 1 | method 1 | method 1 | method 1 | method 2 | method 2 |
| zation conditions | phase (method 1), or formulation for primary polymerization (method 2) | acrylontrile (part) | 10 | 10 | 6 | 10 | 14 | 6 | 16 | 3.5 | 10 | 20 |
| | | styrene(part) | 30 | 55 | 24 | 30 | 26 | 44 | 44 | 40.5 | 40 | 50 |
| | | dodecyl mercaptan (part) | 0.1 | 0.1 | 0.1 | 0.1 | 0.2 | 0.1 | 0.1 | 0.2 | 0.1 | 0.2 |
| | | potassium persulfate(part) | 0.2 | 0.2 | 0.2 | 0.2 | 0.2 | 0.2 | 0.2 | 0.4 | 0.1 | 0.2 |
| | | addition time(hour) | 5 | 5 | 6 | 5 | 7 | 3 | 3 | 5 | 3 | 5 |
| | formulation of resin phase (method 1), or formulation for secondary polymerization (method 2) | acrylonitrile(part) | 4.5 | 4.5 | 5.5 | 12 | 4 | 2.5 | 4 | 1 | 0 | 0 |
| | | styrene(part) | 95.5 | 95.5 | 94.5 | 88 | 96 | 97.5 | 96 | 99 | 60 | 60 |
| | | dodecyl mercaptan (part) | 0.2 | 0.2 | 0.2 | 0.2 | 0.2 | 0.2 | 0.2 | 0.2 | 0.1 | 0.1 |
| | | potassium persulfate(part) | 0.2 | 0.2 | 0.2 | 0.2 | 0.2 | 0.2 | 0.2 | 0.2 | 0.1 | 0.1 |
| | | addition time(hour) | 5 | 5 | 5 | 5 | 5 | 5 | 5 | 5 | 3 | 3 |
| grafted rubber phase/resin phase(part) | | | 52/48 | 77/23 | 44.5/55.5 | 52/48 | 49/51 | 53/47 | 72/28 | 50/50 | — | — |

Preparation of specimen and measurement of physical properties

Specimens having a size of 127 mm ×12.7 mm ×6.4 mm, a size of 127 mm ×12.7 mm ×3.2 mm and a size of 127 mm ×12.7 mm ×1.6 mm, respectively were prepared from a polyphenylene ether resin composition using an injection molding machine (Model IS80AM manufactured and sold by Toshiba Machine Co., Ltd., Japan; cylinder temperature: 270° C., molding cycle: 1 min), and the properties of the specimens were determined according to the following test methods.

(1) Heat distortion temperature:

The heat distortion temperature of the above-prepared specimen having a size of 127 mm ×12.7 mm ×6.4 mm was measured in accordance with ASTM D648 (load: 18.6 kg/cm$^2$).

(2) Fire retardance:

The fire retardance of each of the above-prepared specimens having a size of 127 mm ×12.7 mm ×3.2 mm and a size of 127 mm ×12.7 mm ×1.6 mm were measured in accordance with the method of Vertical Burning Test for Classifying Materials 94V-0, 94V-1 or 94V-2, described in UL-Subject 94, pages 7 to 10 dated Jan.28, 1980, published by Underwriters Laboratories Inc., U.S.A. The classification into materials 94V-0, 94V-1 and 94V-2 (hereinafter simply referred to as "V-0", "V-1" and "V-2", respectively) is conducted according to the following criteria (i) A material classified as V-0 shall:

A. Not have any specimens that burn with flaming combustion for more than 10 seconds after either application of the test flame.

B. Not have a total flaming combustion time exceeding 50 seconds for the 10 flame applications for each set of five specimens.

C. Not have any specimens that burn with flaming or glowing combustion up to the holding clamp.

D. Not have any specimens that drip flaming particles that ignite the dry absorbent surgical cotton located 12 inches (305 mm) below the test specimen.

E. Not have any specimens with glowing combustion that persists for more than 30 seconds after the second removal of the test flame.

(ii) A material classified as V-1 shall:

A. Not have any specimens that burn with flaming combustion for more than 30 seconds after either application of the test flame.

B. Not have a total flaming combustion time exceeding 250 seconds for the 10 flame applications for each set of five specimens.

C. Not have any specimens that burn with flaming or glowing combustion up to the holding clamp.

D. Not have any specimens that drip flaming particles that ignite the dry absorbent surgical cotton located 12 inches (305 mm) below the test specimen.

E. Not have any specimens with glowing combustion that persists for more than 60 seconds after the second removal of the test flame.

(iii) A material classified as V-2 shall:

A. Not have any specimens that burn with flaming combustion for more than 30 seconds after either application of the test flame.

B. Not have a total flaming combustion time exceeding 250 seconds for the 10 flame applications for each set of five specimens.

C. Not have any specimens that burn with flaming or glowing combustion up to the holding clamp.

D. Be permitted to have specimens that drip flaming particles that ignite the dry absorbent surgical cotton placed 12 inches (305 mm) below the test specimen.

E. Not have any specimens with glowing combustion that persists for more than 60 seconds after the second removal of the test flame.

(3) Occurrence of foliation by folding:

The above-prepared specimen having a size of 127 mm × 12.7 mm × 1.6 mm was repeatedly folded at its central portion until the specimen was broken. Then, the broken portion of the specimen was observed with the naked eyes in order to examine whether or not foliation of the specimen occurred.

(4) Izod impact strength:

The Izod impact strength of the above-prepared specimen having a size of 6.4 mm × 12.7 mm × 6.4 mm was measured in accordance with ASTM D 256, notched.

Evaluation of susceptibility to electroless plating

Specimens having a size of 50 mm × 90 mm × 2.5 mm were prepared using an injection molding machine (Model IS80M manufactured and sold by Toshiba Machine Co., Ltd., Japan; cylinder temperature: 270° C., molding cycle: 1 min), and the specimens were subjected to electroless plating under the conditions shown in Table 2 and the electroless plating susceptibility of the specimens was evaluated according to the following test methods.

(1) Deposition (%):

After the electroless plating, the area of the deposit formed on the surface of the specimen was determined and the deposition was calculated from the area (p) of the formed deposit and the surface area (q) of the specimen by the following formula:

$$\text{Deposition (\%)} = \frac{p}{q} \times 100.$$

(2) Adhesion (%):

The specimen having thereon a plating formed by electroless plating was examined by the peel test using an adhesive tape. The adhesion (%) was calculated from the area (x) of the deposit remaining unpeeled and the whole deposit area (y) by the following formula:

$$\text{Adhesion (\%)} = \frac{x}{y} \times 100.$$

(3) Appearance:

The surface of the specimen having thereon a plating formed by electroless plating was observed with the naked eyes.

TABLE 2

| step | treating agent | | tempera-ture (°C.) | time (min.) | remarks |
| --- | --- | --- | --- | --- | --- |
| (1) degreasing | Ace clean A-220** | 50 g/l | 50 | 5 | |
| (2) etching | chromic anhydride sulfuric acid (specific gravity: 1.84) Enplate wetter 820* | 420 g/l 200 ml/l 5 ml/l | 65 | 5 | bubbling with air |
| (3) predipping | Enplate activator 850* additive hydrochloric acid(38%) | 150 g/l 30 ml/l | 25 | 2 | |
| (4) application of catalyst | Enplate activator 850* Enplate activator 850* additive hydrochloric acid(38%) | 20 ml/l 150 g/l 30 ml/l | 25 | 5 | |
| (5) activation of catalyst | Enplate accelerator 860* | 100 ml/l | 25 | 5 | |
| (6) electroless copper plating | Enplate Cu-872A* Enplate Cu-872B* Enplate Cu-872C Enplate stabilizer* | 80 ml/l 65 ml/l 24 ml/l 0.3 ml/l | 50 | 20 | bubbling with air; overflow while continuously filtering and recycling, with addition of a fresh agent |
| (7) application of catalyst | Enplate initiator 852* hydrochloric acid(38%) | 20 ml/l 10 ml/l | 25 | 5 | |
| (8) electroless nickel plating | Enplate NI-419A* Enplate NI-419B* | 60 ml/l 90 ml/l | 70 | 7 | bubbling with air; overflow while continuously filtering and recycling, with addition of a fresh agent |

Note:
(1) Treating agents bearing a mark of * are produced and sold by Japan Meltex Inc., Japan.
(2) Treating agent bearing a mark of ** is produced and sold by Okuno Chemical Industry Co., Ltd., Japan.
(3) Each of treating agents is in the form of aqueous solution in pure water.
(4) Washing with running water is conducted between respective steps after the step of predipping.

EXAMPLE 1

25 Parts by weight of poly(2,6-dimethyl-1,4-phenylene)ether (hereinafter often referred to as "PPE resin") having an intrinsic viscosity [η]of 0.50 (as measured at 30° C. in chloroform), 20 parts by weight of rubber-modified resin No. 1 shown in Table 1, 55 parts by weight of an impact-resistant, rubber modified polystyrene (Styro®490, manufactured and sold by Asahi Kasei Kogyo K.K., Japan), 2.4 parts by weight of a phosphorus composition (Novared®120 UFA, manufactured and sold by Rin Kagaku Kogyo Co., Ltd., Japan) containing 90% by weight of red phosphorous and 10% by weight of a phenol resin, 5 parts by weight of triphenylene phosphate (hereinafter often referred to as "TPP"), 0.5 part by weight of Sumilizer®BHT (trade name of hindered phenol, manufactured and sold by Sumitomo Chemical Co., Ltd., Japan) as a stabilizer and 0.5 part by weight of MARK®PEP-8 (trade name of distearyl pentaerythritol diphosphite, manufactured and sold by ADEKA ARGUS Chemical Co., Ltd., Japan) were blended together by means of a blender, to thereby obtain a polyphenylene ether resin composition.

The above-obtained composition was pelletized by means of an extruder at 280° C. to obtain pellets. The pellets were injection-molded to prepare a specimen in substantially the same manner as mentioned above. The properties of the specimen were determined according to the methods mentioned above. Results are shown in Table 3.

EXAMPLE 2

Substantially the same procedure as in Example 1 was conducted except that 25 parts by weight of rubber-modified resin No. 2 shown in Table 1 was used instead of 20 parts by weight of rubber-modified resin No. 1 and the amount of Styron® 490 (manufactured and sold by Asahi Kasei Kogyo K.K., Japan) was changed to 50 parts by weight from 55 parts by weight, to thereby obtain pellets of a polyphenylene ether resin composition. Then, a specimen was prepared from the pellets and the properties of the specimen were determined according to the methods as mentioned above. Results are shown in Table 3.

COMPARATIVE EXAMPLE 1

Substantially the same procedure as in Example 1 was conducted except that an ABS resin (Stylac® 301, manufactured and sold by Asahi Kasei Kogyo K.K., Japan) was used instead of rubber-modified resin No. 1 and the amount of Novared® 120 UFA (manufactured and sold by Rin Kagaku Kogyo Co., Ltd., Japan) was changed to 4.4 parts by weight from 2.4 parts by weight and that the TPP was not added, to thereby obtain pellets of a polyphenylene ether resin composition. Then, a specimen was prepared from the pellets and the properties of the specimen were determined according to the same methods as mentioned above. Results are shown in Table 3.

COMPARATIVE EXAMPLE 2

Substantially the same procedure as in Example 1 was conducted except that no rubber-modified resin was used and the amount of Styron® 490 (manufactured and sold by Asahi Kasei Kogyo K.K., Japan) was changed to 75 parts by weight from 55 parts by weight, to thereby obtain pellets of a polyphenylene ether resin composition. Then, a specimen was prepared from the pellets and the properties of the specimen were determined according to the same methods as mentioned above. Results are shown in Table 3.

COMPARATIVE EXAMPLE 3

Substantially the same procedure as in Example 2 was conducted except that rubber-modified resin No. 3 shown in Table 1 was used instead of rubber-modified resin No. 2, to thereby obtain pellets of a polyphenylene ether resin composition. Then, a specimen was prepared from the pellets and the properties of the specimen were determined according to the same methods as mentioned above. Results are shown in Table 3.

As apparent from Table 3, the specimens prepared from the resin composition of the present invention exhibited not only excellent heat distortion temperature, Izod impact strength and fire retardance, but also excellent susceptibility to electroless plating. Further, foliation of the specimens did not occur even when the specimens were repeatedly folded (Examples 1 and 2).

By contrast, the specimen which was prepared from a resin composition produced using a customary ABS resin as a rubber-modified resin exhibited disadvantageous foliation when the specimen was repeatedly folded (Comparative Example 1). Further, on the specimen which was prepared from a resin composition produced without incorporating a rubber-modified resin containing an acrylonitrile component, a plating was not formed by electroless plating (Comparative Example 2). Moreover, when a resin composition has a grafting ratio of the elastomeric rubber in the rubber-modified resin which is less than 40%, the specimen of the resin composition exhibits disadvantageous foliation after repeated folding, and is poor in susceptibility to electroless plating (Comparative Example 3).

TABLE 3

| | | Example 1 | Example 2 | Comparative Example 1 | Comparative Example 2 | Comparative Example 3 |
|---|---|---|---|---|---|---|
| rubber-modified resin | resin No. | 1 | 2 | *** | — | 3 |
| | polybutadiene content wt. % | 32 | 28 | 26 | — | 32 |
| | grafting degree wt. % | 52 | 150 | 25 | — | 32 |
| | AN content of graft component wt. % | 24 | 15 | 30 | — | 20 |
| | AN content of resin phase wt. % | 7 | 7 | 30 | — | 6 |
| formulation of composition (parts by weight) | PPE | 25 | 25 | 25 | 25 | 25 |
| | rubber-modified resin | 20 | 25 | 20 | 0 | 25 |
| | Styron 490 | 55 | 50 | 55 | 75 | 50 |
| | Novared 120 UFA | 2.4 | 2.4 | 4.4 | 2.4 | 2.4 |
| | TPP | 5 | 5 | 0 | 5 | 5 |
| | Sumilizer BHT | 0.5 | 0.5 | 0.5 | 0.5 | 0.5 |
| | MARK PEP8 | 0.5 | 0.5 | 0.5 | 0.5 | 0.5 |
| AN content of total of components (A), (B) and (C) wt. % | | 1.5 | 2.1 | | 0 | 1.4 |
| elastomeric rubber content of total of components (A), (B) and (C) wt. % | | 6.4 | 7.0 | | 0 | 8.0 |
| foliation | | not occurred | not occurred | occurred | not occurred | occurred |
| heat distortion temperature °C. | | 92 | 92 | 92 | 88 | 91 |
| Izod impact strength kg · cm/cm | | 16 | 18 | 3 | 12 | 7 |
| fire retardance | 3.2 mm thickness | V-0 | V-0 | V-1 | V-0 | V-0 |
| | 1.6 mm thickness | V-0 | V-0 | V-1 | V-0 | V-0 |
| susceptibility to electroless plating | deposition % | 100 | 100 | — | 0 | 100 |
| | adhesion % | 100 | 100 | — | — | 60 |
| | state of surface | good | good | — | — | roughened |

Note:
*** Stylac 301 was used.

EXAMPLE 3

30 parts by weight of the same PPE resin as described in Example 1, 35 parts by weight of rubber-modified resin No. 1 shown in Table 1, 35 parts by weight of Styron® 490 (manufactured and sold by Asahi Kasei Kogyo K.K., Japan), 2.4 parts by weight of Novared® 120 UFA (manufactured and sold by Rin Kagaku Kogyo Co., Ltd., Japan), 5 parts by weight of resorcinol bisphosphate, 0.5 part by weight of Sumilizer® BHT (trade name of hindered phenol manufactured and sold by Sumitomo Chemical Co., Ltd., Japan) as a stabilizer and 0.5 part by weight of MARK® PEP-8 (trade name of distearyl pentaerythritol diphosphite manufactured and sold by ADEKA ARGUS Chemical Co., Ltd., Japan) were blended together by means of a blender, to thereby obtain a polyphenylene ether resin composition. The thus obtained polyphenylene ether resin composition was pelletized by means of an extruder at 280° C. to obtain pellets. The pellets were injection-molded in substantially the same manner as mentioned above, to thereby obtain a specimen. The properties of the specimen were determined according to the same methods as mentioned above. Results are shown in Table 4.

COMPARATIVE EXAMPLE 4

Substantially the same procedure as in Example 3 was conducted except that rubber-modified resin No. 4 shown in Table 1 was used instead of rubber-modified resin No. 1, to thereby obtain pellets of a polyphenylene ether resin composition. Then, a specimen was prepared from the pellets and the properties of the specimen were determined according to the same methods as mentioned above. Results are shown in Table 4.

COMPARATIVE EXAMPLE 5

Substantially the same procedure as in Example 3 was conducted except that rubber-modified resin No. 5 shown in Table 1 was used instead of rubber-modified resin No. 1, to thereby obtain pellets of a polyphenylene ether resin composition. Then, a specimen was prepared from the pellets and the properties of the specimen were determined according to the same methods as mentioned above. Results are shown in Table 4.

EXAMPLE 4

Substantially the same procedure as in Example 3 was conducted except that rubber-modified resin No. 6 shown in Table 1 was used instead of rubber-modified resin No. 1, to thereby obtain pellets of a polyphenylene ether resin composition. Then, a specimen was prepared from the pellets and the properties of the specimen were determined according to the same methods as mentioned above. Results are shown in Table 4.

EXAMPLE 5

COMPARATIVE EXAMPLE 6

Substantially the same procedure as in Example 4 was conducted except that rubber-modified resin No. 8 shown in Table 1 was used instead of rubber-modified resin No. 6, to thereby obtain pellets of a polyphenylene ether resin composition. Then, a specimen was prepared from the pellets and the properties of the specimen were determined according to the same methods as mentioned above. Results are shown in Table 4.

As apparent from Table 4, the specimens prepared from the resin composition of the present invention exhibited not only excellent heat distortion temperature, Izod impact strength and fire retardance, but also excellent susceptibility to electroless plating. Further, foliation of the specimens did not occur even when the specimens were repeatedly folded (Examples 3 to 5).

By contrast, when the acrylonitrile content of the resin phase was less than 7% by weight (Comparative Example 4), or the acrylonitile content of the graft component was less than 30% by weight (Comparative Example 5), the specimen of the resin composition disadvantageously exhibited foliation after repeated folding of the specimen. Further, when the acrylonitrile content of the total of resin components (A), (B) and (C) was less than 1% by weight (Comparative Example 6), the specimen of the composition was poor in susceptibility to electroless plating.

TABLE 4

| | | Example 3 | Comparative Example 4 | Comparative Example 5 | Example 4 | Example 5 | Comparative Example 6 |
|---|---|---|---|---|---|---|---|
| rubber-modified resin | resin No. | 1 | 4 | 5 | 6 | 7 | 8 |
| | polybutadiene content wt. % | 32 | 32 | 30 | 28 | 30 | 28 |
| | grafting degree wt. % | 52 | 52 | 60 | 62 | 120 | 60 |
| | AN content of graft component wt. % | 24 | 24 | 34 | 12 | 27 | 7.5 |
| | AN content of resin phase wt. % | 7 | 13 | 5 | 4 | 8 | 1.5 |
| formulation of composition (parts by weight) | PPE | 35 | 35 | 35 | 35 | 35 | 35 |
| | rubber-modified resin | 30 | 30 | 30 | 30 | 40 | 30 |
| | Styron 490 | 35 | 35 | 35 | 35 | 25 | 35 |
| | Novared 120 UFA | 2.4 | 2.4 | 2.4 | 2.4 | 2.4 | 2.4 |
| | resorcinol bisphosphate | 5 | 5 | 5 | 5 | 5 | 5 |
| | Sumilizer BHT | 0.5 | 0.5 | 0.5 | 0.5 | 0.5 | 0.5 |
| | MARK PEP8 | 0.5 | 0.5 | 0.5 | 0.5 | 0.5 | 0.5 |
| AN content of total of components (A), (B) and (C) wt. % | | 2.3 | 3.1 | 2.6 | 1.3 | 3.7 | 0.6 |
| elastomeric rubber content of total of components (A), (B) and (C) wt. % | | 9.6 | 9.6 | 9.0 | 8.4 | 12.0 | 8.4 |
| foliation | | not occurred | occurred | occurred | not occurred | not occurred | not occurred |
| heat distortion temperature °C. | | 101 | 102 | 102 | 101 | 104 | 100 |
| Izod impact strength kg · cm/cm | | 22 | 8 | 12 | 18 | 24 | 18 |
| fire retardance | 3.2 mm thickness | V-0 | — | — | V-0 | V-0 | V-0 |
| | 1.6 mm thickness | V-0 | — | — | V-0 | V-1 | V-0 |
| susceptibility to electroless plating | deposition % | 100 | — | — | 100 | 100 | 70 |
| | adhesion % | 100 | — | — | 100 | 100 | 0 |
| | state of surface | good | — | — | good | good | — |

Substantially the same procedure as in Example 4 was conducted except that 40 parts by weight of rubber-modified resin No. 7 shown in Table 1 was used instead of 30 parts by weight of rubber-modified resin No. 6 and the amount of Styron ® 490 (manufactured and sold by Asahi Kasei Kogyo K.K., Japan) was changed to 25 parts by weight from 35 parts by weight to thereby obtain pellets of a polyphenylene ether resin composition. Then, a specimen was prepared from the pellets and the properties of the specimen were determined according to the same methods as mentioned above. Results are shown in Table 4.

EXAMPLE 6

25 parts by weight of the same PPE resin as described in Example 1, 30 parts by weight of rubber-modified resin No. 9 shown in Table 1, 45 parts by weight of Styron ® 490 (manufactured and sold by Asahi Kasei Kogyo K.K., Japan), 2.4 parts by weight of Novared ® 120 UFA (manufactured and sold by Rin Kagaku Kogyo Co., Ltd., Japan), 5 parts by weight of TPP, 0.5 part by weight of Sumilizer ® BHT (trade name of hindered phenol manufactured and sold by Sumitomo Chemical Co., Ltd., Japan) as a stabilizer and 0.5 part by weight of MARK ® PEP-8 (trade name of distearyl pentaerythritol diphosphite manufactured and sold by ADEKA ARGUS Chemical Co., Ltd., Japan) were blended together by means of a blender, to thereby obtain a polyphenylene ether resin composition. The thus obtained polyphenylene ether resin composition was pelletized by means of an extruder at 280° C. to obtain pellets. The pellets were injection-molded in substantially the same manner as mentioned above, to thereby obtain a specimen. The properties of the specimen were determined according to the same methods as mentioned above. Results are shown in Table 5.

EXAMPLE 7

Substantially the same procedure as in Example 6 was conducted except that the amount of rubber-modified resin No. 9 shown in Table 1 was changed to 50 parts by weight from 30 parts by weight and the amount of Styron® 490 (manufactured and sold by Asahi Kasei Kogyo K.K., Japan) was changed to 25 parts by weight from 45 parts by weight, to thereby obtain pellets of a polyphenylene ether resin composition. Then, a specimen was prepared from the pellets and the properties of the specimen were determined according to the same methods as mentioned above. Results are shown in Table 5.

COMPARATIVE EXAMPLE 7

Substantially the same procedure as in Example 7 was conducted except that the amount of rubber-modified resin No. 9 shown in Table 1 was changed to 70 parts by weight from 50 parts by weight and the amount of Styron® 490 (manufactured and sold by Asahi Kasei Kogyo K.K., Japan) was changed to 5 parts by weight from 25 parts by weight, top thereby obtain pellets of a polyphenylene ether resin composition. Then, a specimen was prepared from the pellets and the properties of the specimen were determined according to the same methods as mentioned above. Results are shown in Table 5.

COMPARATIVE EXAMPLE 8

Substantially the same procedure as in Example 6 was conducted except that the amount of rubber-modified resin No. 9 shown in Table 1 was changed to 8 parts by weight from 30 parts by weight and the amount of Styron® 490 (manufactured and sold by Asahi Kasei Kogyo K.K., Japan) was changed to 67 parts by weight from 45 parts by weight, to thereby obtain pellets of a polyphenylene ether resin composition. Then, a specimen was prepared from the pellets and the properties of the specimen were determined according to the same methods as described above. Results are shown in Table 5.

As apparent from Table 5, the specimens prepared from the resin composition of the present invention exhibited not only excellent heat distortion temperature, Izod impact strength and fire retradance, but also excellent susceptibility to electroles plating. Further, the foliation of the specimens did not occur when the specimens were repeatedly folded (Examples 6 and 7).

By contrast, when the elastomeric rubber content of the total of resin components (A), (B) and (C) was less than 20% by weight (Comparative Example 7), the specimen of the composition was poor in fire retardance. Further, when the specimen was subjected to electroless plating, the surface of the specimen was overetched to cause the surface of the specimen to be roughened. Further, when the proportion of a rubber-modified resin was less than 10% by weight so that the acrylonitrile content of the total of resin components (A), (B) and (C) was less than 1% by weight (Comparative Example 8), the specimen of the composition was poor in susceptibility to electroless plating.

TABLE 5

| | | Example 6 | Example 7 | Comparative Example 7 | Comparative Example 8 |
|---|---|---|---|---|---|
| rubber-modified resin | resin No. | 9 | 9 | 9 | 9 |
| | polybutadiene content wt. % | 32 | 32 | 32 | 32 |
| | grafting degree wt. % | 80 | 80 | 80 | 80 |
| | AN content of graft component wt. % | 16 | 16 | 16 | 16 |
| | AN content of resin phase wt. % | 5 | 5 | 5 | 5 |
| formulation of composition (parts by weight) | PPE | 25 | 25 | 25 | 25 |
| | rubber-modified resin | 30 | 50 | 70 | 8 |
| | Styron 490 | 45 | 25 | 5 | 67 |
| | Novared 120 UFA | 2.4 | 2.4 | 2.4 | 2.4 |
| | TPP | 5 | 5 | 5 | 5 |
| | Sumilizer BHT | 0.5 | 0.5 | 0.5 | 0.5 |
| | MARK PEP8 | 0.5 | 0.5 | 0.5 | 0.5 |
| AN content of total of components (A), (B) and (C) wt. % | | 1.0 | 3.1 | 4.3 | 0.5 |
| elastomeric rubber content of total of components (A), (B) and (C) wt. % | | 9.6 | 16.0 | 22.4 | 2.6 |
| foliation | | not occurred | not occurred | not occurred | not occurred |
| heat distortion temperature °C. | | 90 | 92 | 93 | 90 |
| Izod impact strength kg · cm/cm | | 22 | 26 | 25 | 14 |
| fire retardance | 3.2 mm thickness | V-0 | V-0 | V-1 | V-0 |
| | 1.6 mm thickness | V-0 | V-1 | HB**** | V-0 |
| susceptibility to electroless plating | depositon % | 100 | 100 | 100 | 20 |
| | adhesion % | 100 | 97 | 90 | 0 |
| | state of surface | good | slightly roughened | roughened | — |

Note:
****More flammable than that of Class V-2.

EXAMPLE 8

25 parts by weight of the same PPE resin as described in Example 1, 32 parts by weight of rubber-modified resin No. 10 shown in Table 1, 43 parts by weight of Styron® 490 (manufactured and sold by Asahi Kasei Kogyo K.K., Japan), 2.2 parts by weight of Novared® 120 UFA (manufactured and sold by Rin Kagaku Kogyo Co., Ltd., Japan), 7 parts by weight of TPP, 0.5 part by weight of Sumilizer® BHT (trade name of hindered phenol manufactured and sold by Sumitomo Chemical Co., Ltd., Japan) as a stabilizer and 0.5 part by weight of MARK® PEP-8 (trade name of distearyl pentaerythritol diphosphite manufactured and sold by ADEKA ARGUS Chemical Co., Ltd., Japan) were blended together by means of a blender, to thereby obtain a polyphenylene ether resin composition. The thus obtained polyphenylene ether resin composition was pelletized by means of an extruder at 280° C. to obtain pellets. The pellets were injection-molded in substantially the same manner as mentioned above, to thereby obtain a specimen. The properties of the specimen were determined according to the same methods as mentioned above. Results are shown in Table 6.

EXAMPLE 9

Substantially the same procedure as in Example 8 was conducted except that the amounts of rubber-modified resin No. 10, Styron® 490 (manufactured and sold by Asahi Kasei Kogyo K.K., Japan), and Novared® 120 UFA (manufactured and sold by Rin Kagaku Kogyo Co., Ltd., Japan) were changed to 45 parts by weight from 32 parts by weight, 30 parts by weight from 43 parts by weight and 2.8 parts by weight from 2.2 parts by weight, respectively, to thereby obtain pellets of a polyphenylene ether resin composition. Then, a specimen was prepared from the pellets and the properties of the specimen were determined according to the same methods as described above. Results are shown in Table 6.

COMPARATIVE EXAMPLE 9

Substantially the same procedure as in Example 9 was conducted except that the amounts of rubber-modified resin No. 10, Styron® 490 (manufactured and sold by Asahi Kasei Kogyo K.K., Japan), and Novared® 120 UFA (manufactured and sold by Rin Kagaku Kogyo Co., Ltd., Japan) were changed to 65 parts by weight from 45 parts by weight, 10 parts by weight from 30 parts by weight and 3.3 parts by weight from 2.8 parts by weight, respectively, to thereby obtain pellets of a polyphenylene ether resin composition. Then, a specimen was prepared from the pellets and the properties of the specimen were determined according to the same methods as described above. Results are shown in Table 6.

As apparent from Table 6, the specimens prepared from the resin composition of the present invention exhibited not only excellent heat distortion temperature, Izod impact strength and fire retardance, but also excellent susceptibility to electroless plating. Further, foliation of the specimens did not occur even when the specimens were repeatedly folded (Examples 8 and 9).

By contrast, when the acrylonitrile content of the total of resin components (A), (B) and (C) was more than 7% by weight (Comparative Example 9), the specimen of the resin composition was susceptible to deposition by electroless plating. However, the surface of the specimen was not sufficiently etched and, therefore, the specimen of the resin composition was poor in adhesion of a plating formed by the electroless plating.

TABLE 6

|  |  | Example 8 | Example 9 | Comparative Example 9 |
|---|---|---|---|---|
| rubber- | resin No. | 10 | 10 | 10 |
| modified | polybutadiene content wt. % | 20 | 20 | 20 |
| resin | grafting degree wt. % | 200 | 200 | 200 |
|  | AN content of graft component wt. % | 26 | 26 | 26 |
|  | AN content of resin phase wt. % | 8 | 8 | 8 |
| formulation | PPE | 25 | 25 | 25 |
| of composi- | rubber-modified resin | 32 | 45 | 65 |
| tion (parts | Styron 490 | 43 | 30 | 10 |
| by weight) | Novared 120 UFA | 2.2 | 2.8 | 3.3 |
|  | TPP | 7 | 7 | 7 |
|  | Sumilizer BHT | 0.5 | 0.5 | 0.5 |
|  | MARK PEP8 | 0.5 | 0.5 | 0.5 |
| AN content of total of components (A), (B) and (C) wt. % |  | 4.4 | 6.1 | 8.8 |
| elastomeric rubber content of total of components (A), (B) and (C) wt. % |  | 6.4 | 9 | 13 |
| foliation |  | not occurred | not occurred | not occurrred |
| heat distortion temperature °C. |  | 85 | 86 | 88 |
| Izod impact strength kg · cm/cm |  | 17 | 20 | 5 |
| fire | 3.2 mm thickness | V-0 | V-0 | V-0 |
| retardance | 1.6 mm thickness | V-0 | V-0 | V-1 |
| suscepti- | deposition % | 100 | 100 | 100 |
| bility to | adhesion % | 100 | 97 | 70 |
| electroless | state of | good | good | good |
| plating | surface |  |  |  |

EXAMPLE 10

50 parts by weight of the same PPE resin as described in Example 1, 30 parts by weight of rubber-modified resin No. 9 shown in Table 1, 20 parts by weight of Styron® 490 (manufactured and sold by Asahi Kasei Kogyo K.K., Japan), 1.7 parts by weight of Novared® 120 UFA (manufactured and sold by Rin Kagaku Kogyo Co., Ltd., Japan), 6 parts by weight of TPP, 0.5 part by weight of BHT (trade name of hindered phenol manufactured and sold by Sumitomo Chemical Co., Ltd., Japan) as a stabilizer and 0.5 part by weight of MARK® PEP-8 (trade name of distearyl pentaerythritol diphosphite manufactured and sold by ADEKA ARGUS Chemical Co., Ltd., Japan) were blended together by means of a blender, to thereby obtain a polyphenylene ether resin composition. The thus obtained polyphenylene ether resin composition was pelletized by means of an extruder at 300° C. to obtain pellets. The pellets were injection-molded in substantially the same manner as mentioned above, to thereby obtain a specimen. The properties of the specimen were determined according to the same methods as mentioned above. Results are shown in Table 7.

COMPARATIVE EXAMPLE 10

Substantially the same procedure as in Example 10 was conducted except that the amounts of the PPE resin, Styron® 490 (manufactured and sold by Asahi Kasei Kogyo K.K., Japan), and Novared® 120 UFA (manufactured and sold by Rin Kagaku Kogyo Co., Ltd., Japan) were changed to 65 parts by weight from 50 parts by weight, 5 parts by weight from 20 parts by weight and 1.1 parts by weight from 1.7 parts by weight, respectively, to thereby obtain pellets of a polyphenylene ether resin composition. Then, a specimen was prepared from the pellets and the properties of the specimen were determined according to the same methods as mentioned above. Results are shown in Table 7.

EXAMPLE 11

15 parts by weight of the same PPE resin as described in Example 1, 30 parts by weight of rubber-modified resin No. 9 shown in Table 1, 55 parts by weight of Styron® 490 (manufactured and sold by Asahi Kasei Kogyo K.K., Japan), 3.3 parts by weight of Novared® 120 UFA (manufactured and sold by Rin Kagaku Kogyo Co., Ltd., Japan), 10 parts by weight of TPP, 0.5 part by weight of Sumilizer® BHT (trade name of hindered phenol manufactured and sold by Sumitomo Chemical Co., Ltd., Japan) as a stabilizer and 0.5 part by weight of MARK® PEP-8 (trade name of distearyl pentaerythritol diphosphite manufactured and sold by ADEKA ARGUS Chemical Co., Ltd., Japan) were blended together by means of a blender, to thereby obtain a polyphenylene ether resin composition. The thus obtained polyphenylene ether resin composition was pelletized by means of an extruder at 280° C. to obtain pellets. The pellets were injection-molded in substantially the same manner as mentioned above, to thereby obtain a specimen. The properties of the specimen were determined according to the same methods as mentioned above. Results are shown in Table 7.

COMPARATIVE EXAMPLE 11

Substantially the same procedure as in Example 11 was conducted except that the amounts of the PPE resin, Styron® 490 (manufactured and sold by Asahi Kasei Kogyo K.K., Japan) and TPP were changed to 8 parts by weight from 15 parts by weight, 62 parts by weight from 55 parts by weight and 13 parts by weight from 10 parts by weight, respectively, to thereby obtain pellets of a polyphenylene ether resin composition. Then, a specimen was prepared from the pellets and the properties of the specimen were determined according to the same methods as mentioned above. Results are shown in Table 7.

EXAMPLE 12

30 parts by weight of the same PPE resin as described in Example 1, 30 parts by weight of rubber-modified resin No. 9 shown in Table 1, 40 parts by weight of Styron® 490 (manufactured and sold by Asahi Kasei Kogyo K.K., Japan), 2.2 parts by weight of Novared® 120 UFA (manufactured and sold by Rin Kagaku Kogyo Co., Ltd., Japan), 8 parts by weight of TPP, 0.5 part by weight of BHT (trade name of hindered phenol manufactured and sold by Sumitomo Chemical Co., Ltd., Japan) as a stabilizer and 0.5 part by weight of MARK® PEP-8 (trade name of distearyl pentaerythritol diphosphite manufactured and sold by ADEKA ARGUS Chemical Co., Ltd., Japan) were blended together by means of a blender, to thereby obtain a polyphenylene ether resin composition. The thus obtained polyphenylene ether resin composition was pelletized by means of an extruder at 280° C. to obtain pellets. The pellets were injection-molded in substantially the same manner as mentioned above, to thereby obtain a specimen. The properties of the specimen were determined according to the same methods as mentioned above. Results are shown in Table 7.

COMPARATIVE EXAMPLE 12

Substantially the same procedure as in Example 12 was conducted except that the amounts of the TPP and Novared® 120 UFA (manufactured and sold by Rin Kagaku Kogyo Co., Ltd., Japan) were changed to 14 parts by weight from 8 parts by weight and 1.1 parts by weight from 2.2 parts by weight, respectively, to thereby obtain pellets of a polyphenylene ether resin composition. Then, a specimen was prepared from the pellets and the properties of the specimen were determined according to the same methods as mentioned above. Results are shown in Table 7.

As apparent from Table 7, the specimens prepared from the resin composition of the present invention exhibited not only excellent heat distortion temperature, Izod impact strength and fire retardance, but also excellent susceptibility to electroless plating. Further, foliation of the specimens did not occur when the specimens were repeatedly folded (Examples 10 to 12).

By contrast, when the PPE resin content of the resin composition was more than 60% by weight (Comparative Example 10), the surface of the specimen prepared from the composition was overetched to cause the surface of the specimen to be roughened and, therefore, the specimen of the resin composition was poor in adhesion of a plating formed by the electroless plating. Further, since the PPE resin content of the resin composition of Comparative Example 11 was less than 10% by weight, even when the TPP (fire retardant) content was as high as 13% by weight, the specimen of the composition was poor in fire retardance. Further, when the TPP content was more than 12% by weight (Comparative Examples 1 and 12), the specimen of the composition was poor in susceptibility to electroless plating.

TABLE 7

|  |  | Example 10 | Comparative Example 10 | Example 11 | Comparative Example 11 | Example 12 | Comparative Example 12 |
| --- | --- | --- | --- | --- | --- | --- | --- |
| rubber- | resin No. | 9 | 9 | 9 | 9 | 9 | 9 |
| modified | polybutadiene content wt. % | 32 | 32 | 32 | 32 | 32 | 32 |
| resin | grafting degree wt. % | 80 | 80 | 80 | 80 | 80 | 80 |
|  | AN content of graft component wt. % | 16 | 16 | 16 | 16 | 16 | 16 |
|  | AN content of resin phase wt. % | 5 | 5 | 5 | 5 | 5 | 5 |
| formulation | PPE | 50 | 65 | 15 | 8 | 30 | 30 |

TABLE 7-continued

|  |  | Example 10 | Comparative Example 10 | Example 11 | Comparative Example 11 | Example 12 | Comparative Example 12 |
|---|---|---|---|---|---|---|---|
| of composition (parts by weight) | rubber-modified resin | 30 | 30 | 30 | 30 | 30 | 30 |
|  | Styron 490 | 20 | 5 | 55 | 62 | 40 | 40 |
|  | Novared 120 UFA | 1.7 | 1.1 | 3.3 | 3.3 | 2.2 | 1.1 |
|  | TPP | 6 | 6 | 10 | 13 | 8 | 14 |
|  | Sumilizer BHT | 0.5 | 0.5 | 0.5 | 0.5 | 0.5 | 0.5 |
|  | MARK PEP8 | 0.5 | 0.5 | 0.5 | 0.5 | 0.5 | 0.5 |
| AN content of total of components (A), (B) and (C) wt. % | | 1.9 | 1.9 | 1.9 | 1.9 | 1.9 | 1.9 |
| elastomeric rubber content of total of components (A), (B) and (C) wt. % | | 9.4 | 9.4 | 9.4 | 9.4 | 9.4 | 9.4 |
| foliation | | not occurred | not occurred | not occurred | not occurred | not occurred | not occurred |
| heat distortion temperature °C. | | 107 | 121 | 72 | 63 | 86 | 70 |
| Izod impact strength kg · cm/cm | | 22 | 20 | 20 | 18 | 20 | 24 |
| fire retardance | 3.2 mm thickness | V-0 | V-0 | V-0 | V-1 | V-0 | V-0 |
|  | 1.6 mm thickness | V-0 | V-0 | V-1 | V-2 | V-0 | V-1 |
| susceptibility to electroless plating | deposition % | 100 | 100 | 100 | 50 | 100 | 30 |
|  | adhesion % | 100 | 60 | 98 | 0 | 100 | 0 |
|  | state of surface | good | roughened | good | — | good | — |

EXAMPLE 13

27 parts by weight of the same PPE resin as described in Example 1, 25 parts by weight of rubber-modified resin No. 1 shown in Table 1, 48 parts by weight of Styron® 490 (manufactured and sold by Asahi Kasei Kogyo K.K., Japan), 3.3 parts by weight of Novared® 120 UFA (manufactured and sold by Rin Kagaku Kogyo Co., Ltd., Japan), 7 parts by weight of TPP, 0.5 part by weight of Sumilizer® BHT (trade name of hindered phenol manufactured and sold by Sumitomo Chemical Co., Ltd., Japan) as a stabilizer and 0.5 part by weight of MARK® PEP-8 (trade name of distearyl pentaerythritol diphosphite manufactured and sold by ADEKA ARGUS Chemical Co., Ltd., Japan) were blended together by means of a blender, to thereby obtain a polyphenylene ether resin composition. The thus obtained polyphenylene ether resin composition was pelletized by means of an extruder at 280° C. to obtain pellets. The pellets were injection-molded in substantially the same manner as mentioned above, to thereby obtain a specimen. The properties of the specimen were determined according to the same methods as mentioned above. Results are shown in Table 8.

EXAMPLE 14

Substantially the same procedure as in Example 13 was conducted except that the amounts of the TTP and Novared® 120 UFA (manufactured and sold by Rin Kagaku Kogyo Co., Ltd., Japan) were changed to 5 parts by weight from 7 parts by weight and 4.1 parts by weight from 3.3 parts by weight, respectively, to thereby obtain pellets of a polyphenylene ether resin composition. Then, a specimen was prepared from the pellets and the properties of the specimen were determined according to the same methods as mentioned above. Results are shown in Table 8.

COMPARATIVE EXAMPLE 14

Substantially the same procedure as in Example 13 was conducted except that the amounts of the TPP and Novared® 120 UFA (manufactured and sold by Rin Kagaku Kogyo Co., Ltd., Japan) were changed to 3 parts by weight from 5 parts by weight and 5.6 parts by weight from 3.3 parts by weight, respectively, to thereby obtain pellets of a polyphenylene ether resin composition. Then, a specimen was prepared from the pellets and the properties of the specimen were determined according to the same methods as mentioned above. Results are shown in Table 8.

COMPARATIVE EXAMPLE 15

Substantially the same procedure as in Example 15 was conducted except that TPP was not added, to thereby obtain pellets of a polyphenylene ether resin composition. Then, a specimen was prepared from the pellets and the properties of the specimen were determined according to the same methods as mentioned above. Results are shown in Table 8.

COMPARATIVE EXAMPLE 16

Substantially the same procedure as in Example 13 was conducted except that the amount of Novared® 120 UFA (manufactured and sold by Rin Kagaku Kogyo Co., Ltd., Japan) was changed to 0.8 part by weight from 3.3 parts by weight, to thereby obtain pellets of a polyphenylene ether resin composition. Then, a specimen was prepared from the pellets and the properties of the specimen were determined according to the same methods as mentioned above. Results are shown in Table 8.

As apparent from Table 8, the specimens prepared from the resin composition of the present invention exhibited not only excellent heat distortion temperature, Izod impact strength and fire retardance, but also excellent susceptibility to electroless plating. Further, foliation of the specimens did not occur when the specimens were repeatedly folded (Examples 14 and 15).

By contrast, when the red phosphorus content was more than 4% by weight, the compositions were poor in Izod impact strength (Comparative Examples 14 and 15). Further, since the composition of Comparative Example 15 contained no TPP (fire retardant), the composition was poor in fire retardance. Further, when the red phosphorus content was less than 1% by weight (Comparative Example 16), the composition was poor in fire retardance.

TABLE 8

|  |  | Example 13 | Example 14 | Comparative Example 14 | Comparative Example 15 | Comparative Example 16 |
|---|---|---|---|---|---|---|
| rubber-modified resin | resin No. | 1 | 1 | 1 | 1 | 1 |
|  | polybutadiene content wt. % | 32 | 32 | 32 | 32 | 32 |
|  | grafting degree wt. % | 52 | 52 | 52 | 52 | 52 |
|  | AN content of graft component wt. % | 24 | 24 | 24 | 24 | 24 |
|  | AN content of resin phase wt. % | 7 | 7 | 7 | 7 | 7 |
| formulation of composition (parts by weight) | PPE | 27 | 27 | 27 | 27 | 27 |
|  | rubber-modified resin | 25 | 25 | 25 | 25 | 25 |
|  | Styron 490 | 48 | 48 | 48 | 48 | 48 |
|  | Novared 120 UFA | 3.3 | 4.1 | 5.6 | 5.6 | 0.8 |
|  | TPP | 7 | 5 | 3 | 0 | 7 |
|  | Sumilizer BHT | 0.5 | 0.5 | 0.5 | 0.5 | 0.5 |
|  | MARK PEP8 | 0.5 | 0.5 | 0.5 | 0.5 | 0.5 |
| AN content of total of components (A), (B) and (C) wt. % | | 1.9 | 1.9 | 1.9 | 1.9 | 1.9 |
| elastomeric rubber content of total of components (A), (B) and (C) wt. % | | 8 | 8 | 8 | 8 | 8 |
| foliation | | not occurred | not occurred | not occurred | not occurred | not occurred |
| heat distortion temperature °C. | | 84 | 88 | 94 | 105 | 85 |
| Izod impact strength kg · cm/cm | | 12 | 8 | 5 | 4 | 16 |
| fire retardance | 3.2 mm thickness | V-0 | V-0 | V-0 | V-1 | V-1 |
|  | 1.6 mm thickness | V-0 | V-0 | V-0 | V-1 | V-2 |
| susceptibility to electroless plating | deposition % | 100 | 100 | 100 | 100 | 100 |
|  | adhesion % | 100 | 98***** | 95***** | 95***** | 100 |
|  | state of surface | good | good | good | good | good |

Note:
*****A plating was peeled off from a surface portion of the shaped article at which red phosphorus appears.

What is claimed is:

1. An electroless plating-susceptive, fire retardant polyphenylene ether resin composition comprising:
   (A) 10 to 60% by weight, based on the total weight of components (A), (B) and (C), of a polyphenylene ether resin;
   (B) 10 to 90% by weight, based on the total weight of components (A), (B) and (C), of a rubber-modified resin comprising ($\alpha$) a grafted rubber phase comprising an elastomeric rubber having grafted thereto a graft component composed of acrylonitrile units and vinyl aromatic compound units and ($\beta$) a resin phase of a polymer or polymer mixture comprising acrylonitrile units and vinyl aromatic compound units,
   said grafted rubber phase ($\alpha$) having a grafting degree of from 40 to 300% as defined by the ratio (%) of the weight of said graft component grafted to the elastomeric rubber to the weight of said elastomeric rubber,
   the content of the acrylonitrile units in said graft component and the content of the acrylonitrile units in resin phase ($\beta$) being from 10 to 30% by weight, based on the weight of said graft component and from 3 to 9% by weight, based on the weight of resin phase ($\beta$), respectively,
   the amount of all the acrylonitrile units in rubber-modified resin (B) being from 1 to 7% by weight, based on the total weight of components (A), (B) and (C),
   the amount of said elastomeric rubber being from 5 to 20% by weight, based on the total weight of components (A), (B) and (C);
   (C) 0 to 80% by weight, based on the total weight of components (A), (B) and (C), of a polystyrene resin;
   (D) 1 to 4 parts by weight of red phosphorus per 100 parts by weight of the total of components (A), (B) and (C); and
   (E) 1 to 12 parts by weight of a phosphoric acid ester per 100 parts by weight of the total of components (A), (B) and (C).

2. The composition according to claim 1, wherein the amounts of components (A), (B) and (C) are from 20 to 40% by weight, from 15 to 70% by weight and from 0 to 65% by weight, respectively, based on the total weight of components (A), (B) and (C); the amount of all the acrylonitrile units in rubber-modified resin (B) is from 1 to 5% by weight, based on the total weight of components (A), (B) and (C); the amount of said elastomeric rubber is from 5 to 15% by weight, based on the total weight of components (A), (B) and (C); and the amounts of red phosphorus (D) and phosphoric acid ester (E) are from 1.5 to 3.5 parts by weight and from 3 to 10 parts by weight, respectively, per 100 parts by weight of the total of components (A), (B) and (C).

3. The composition according to claim 1, wherein component (A) is a polyphenylene ether resin selected from the group consisting of poly(2,6-dimethyl-1,4-phenylene) ether, a copolymer of 2,6-dimethylphenol and 2,3,6-trimethyl phenol, and mixtures thereof.

4. The composition according to any one of claims 1 to 3, wherein the vinyl aromatic compound of each of grafted rubber phase ($\alpha$) and resin phase ($\beta$) of component (B) is styrene.

5. The composition according to any one of claims 1 to 3, wherein component (C) is a polystyrene resin selected from the group consisting of polystyrene, a high impact polystyrene and mixtures thereof.

6. The composition according to any one of claims 1 to 3, wherein said phosphoric acid ester of component (D) is an aromatic phosphoric acid ester.

7. The composition according to any one of claims 1 to 3, which has flammability and glowing characteristics of Class V-0 defined in UL-94 standard of Vertical Burning Test, as tested with respect to a sample having a thickness of 3.2 mm.

8. The composition according to any one of claims 1 to 3, which has flammability and glowing characteristics of Class V-0 or V-1 defined in UL-94 standard of Vertical Burning Test, as tested with respect to a sample having a thickness of 1.6 mm.

9. The composition according to any one of claims 1, 2 and 3, which is a shaped article.

10. The composition according to claim 9, having thereon a plating formed by electroless plating.

* * * * *